US010395856B2

(12) United States Patent
Li

(10) Patent No.: US 10,395,856 B2
(45) Date of Patent: Aug. 27, 2019

(54) BUS TYPE SWITCH SOCKET BRACKET

(71) Applicant: SHENZHEN POWER2CONTROL SMART TECH CO., LTD, Shenzhen (CN)

(72) Inventor: Hui Li, Huizhou (CN)

(73) Assignee: SHENZHEN POWER2CONTROL SMART TECH CO., LTD, Shenzhen (CN)

( * ) Notice: Subject to any disclaimer, the term of this patent is extended or adjusted under 35 U.S.C. 154(b) by 7 days.

(21) Appl. No.: 15/558,557

(22) PCT Filed: Jan. 28, 2016

(86) PCT No.: PCT/CN2016/072419
§ 371 (c)(1),
(2) Date: Sep. 15, 2017

(87) PCT Pub. No.: WO2016/169314
PCT Pub. Date: Oct. 27, 2016

(65) Prior Publication Data

US 2018/0061589 A1 Mar. 1, 2018

(30) Foreign Application Priority Data

Apr. 24, 2015 (CN) .......................... 2015 1 0199591

(51) Int. Cl.
*H02G 3/00* (2006.01)
*H01H 9/02* (2006.01)
(Continued)

(52) U.S. Cl.
CPC ............. *H01H 9/02* (2013.01); *H01R 13/518* (2013.01); *H01R 13/73* (2013.01); *H01R 25/161* (2013.01)

(58) Field of Classification Search
CPC ................................ H02G 3/123; H02B 1/044
(Continued)

(56) References Cited

U.S. PATENT DOCUMENTS 5,959,844 A * 9/1999 Simon .................... B60K 37/02 361/759
9,865,971 B2 * 1/2018 Garcia ................... H01R 13/74
2008/0251650 A1 * 10/2008 de la Borbolla ....... H02G 3/086 248/27.1

FOREIGN PATENT DOCUMENTS

CN 2627688Y A 7/2004
CN 2627689Y A 7/2004
(Continued)

OTHER PUBLICATIONS

International Publication for PCT/CN2016/072419.
Translation of the ISR.

*Primary Examiner* — Steven M Marsh

(57) ABSTRACT

A bus type switch socket bracket includes a bracket body (1). The bracket body (1) includes at least one control panel mounting hole (7). A bare metal contact pad (3) are arranged at the sides of the control panel mounting hole (7) and connected to a metal body (2) embedded in the bracket body (1). The bare metal contact pad (3) serves as a bus access port for providing low-voltage direct current power supply, communication and control lines of various control panels mounted on the bracket body (1). By means of providing a bracket body and a bus in the bracket body, the bus type switch socket bracket provides a hardware platform and a mounting space for application extension of an intelligent control device, and is simple in structure and convenient to use.

5 Claims, 2 Drawing Sheets

(51) Int. Cl.
*H01R 13/518* (2006.01)
*H01R 13/73* (2006.01)
*H01R 25/16* (2006.01)

(58) Field of Classification Search
USPC ............................... 248/27.1, 27.3, 200, 906
See application file for complete search history.

(56) References Cited

FOREIGN PATENT DOCUMENTS

| | | | | | |
|---|---|---|---|---|---|
| CN | 2692884Y | A | | 4/2005 | |
| GB | 356431 | A | * | 9/1931 | ............... H02B 1/42 |
| JP | 2008-243549 | A | | 10/2008 | |

* cited by examiner

BUS TYPE SWITCH SOCKET BRACKET

BACKGROUND

1. Technical Field

The present disclosure generally relates to matching products of switch receptacles field, and especially relates to a bus type switch socket bracket.

2. Description of Related Art

With the popularization and development of internet of things, a large number of portable intelligent hardware products are emerging, however, what follows is how to solve the problem of power and installation of these intelligent hardware products. If the battery is used, its use cycle and lifetime are limited. If using an external power supply, it is needed to pull cable, which not only affects the appearance, but also there even may be security risks. Coupled with it is difficult to find the right place to put it, which resulting in its use is very inconvenient.

SUMMARY

The technical problems to be solved: in view of the shortcomings of the related art, the disclosure relates to a bus type switch socket bracket which is installed on a bottom box of the conventional one or more parallel standard switch receptacles to solve the bus installation problem of the intelligent products.

In one aspect, a bus type switch socket bracket includes a bracket body which includes at least one control panel mounting hole, an bare metal contact pad is arranged on the sides of the control panel mounting hole and connected with a metal body embedded in the bracket body. The bare metal contact pad serves as a bus access port which is provided low-voltage direct current power supply, communication and control lines of various control panels mounted on the bracket body.

Wherein a bracket mounting hole is arranged on the sides of the control panel mounting hole.

Wherein the bare metal contact pad is arranged on the upper and low ends of two opposite sides of the control panel mounting hole.

Wherein a pair of bracket mounting holes is respectively arranged in the middle of two sides of the control panel mounting hole.

Wherein the metal body is connected with a second metal body received in the bracket body.

Wherein the second metal body is covered with insulating material.

Wherein the metal body is a linear metal body.

Wherein the second metal body is a linear metal body.

The present disclosure provides the advantages as below.

The present disclosure adopted the above technical proposal effectively solves the problem of the bus installation in all kinds of intelligent products. The present disclosure makes full use of the original switch receptacle in the building as the base of power supply and installation. By means of providing a bracket body and a bus in the bracket body, the bus type switch socket bracket provides a hardware platform and a mounting space for application extension of an intelligent control device, and is simple in structure and convenient to use.

Figure 1:
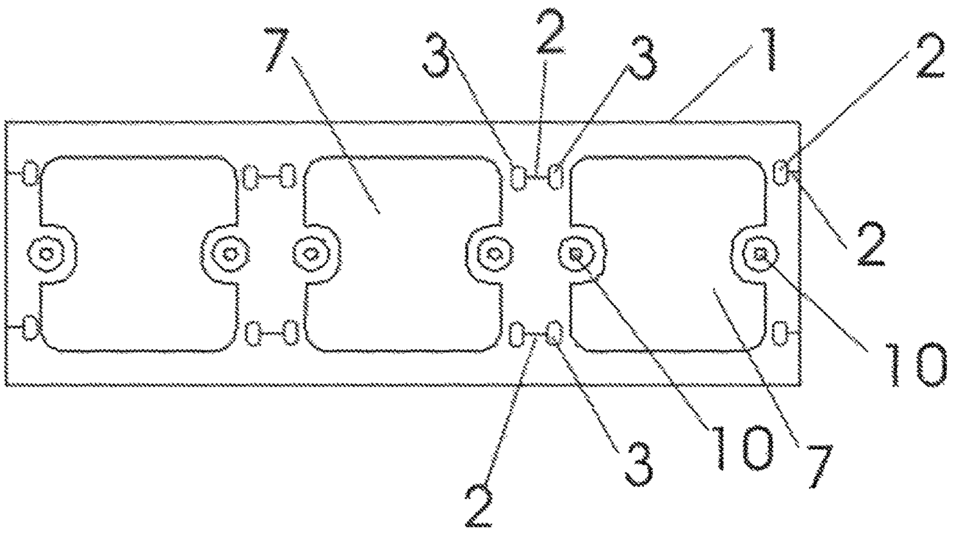
FIG. 1 is a schematic view of the bus type switch socket bracket in accordance with a first embodiment.

In the figures, the element labels according to the embodiments of the present disclosure shown as below:

bracket body 1, metal body 2, bare metal contact pad 3, receiving room 4, second metal body 5, screw mounting portion 6, control panel mounting hole 7, switch receptacle bottom box 8, control panel screwing hole 9, bracket mounting hole 10, control panel 11, backseat 12.

DETAILED DESCRIPTION

Referring to FIG. 1, the bus type switch socket bracket according to a first embodiment includes a bracket body 1. The bracket body 1 includes at least one control panel mounting hole 7. An bare metal contact pad 3 is arranged on the sides of the control panel mounting hole 7 and connected with a metal body 2 embedded in the bracket body 1. The bare metal contact pad 3 serves as a bus access port which is provided low-voltage direct current power supply, communication and control lines of various control panels 11 (seen in FIG. 4) mounted on the bracket body 1. A pair of bracket mounting hole 10 is respectively arranged in the middle of two sides of the control panel mounting hole 7. The control panel mounting hole 7 is provided for the installation of the control panel 11 of various intelligent products.

In the first embodiment of the present disclosure, the metal body 2 is a linear metal body. There may have a plurality of bare metal contact pads 3 arranged on the upper and low ends of two opposite sides of the control panel mounting hole 7. There may have three control panel mounting holes 7 parallelly arranged on the bracket body 1. The control panel mounting hole 7 is square structure.

Figure 2:
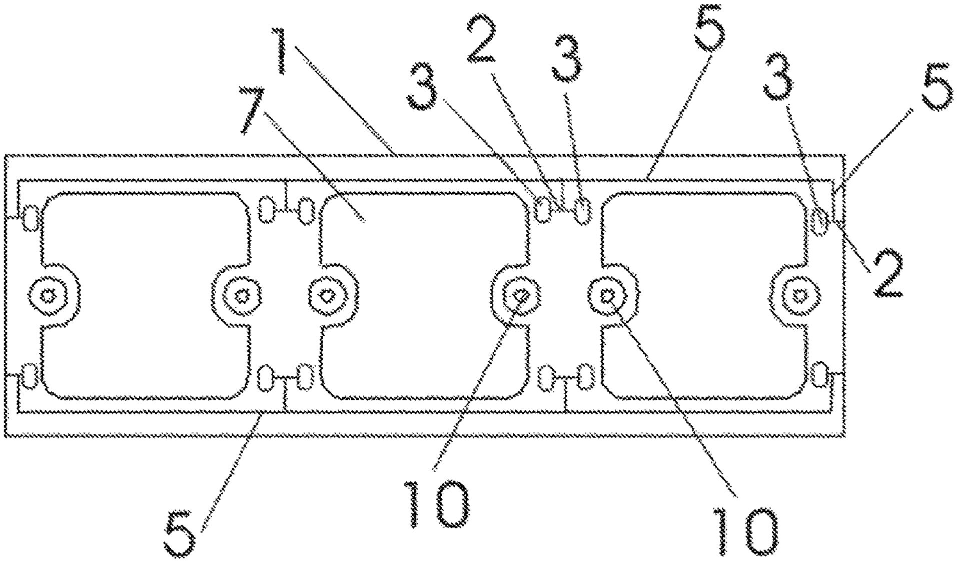
FIG. 2 is a schematic view of the bus type switch socket bracket in accordance with a second embodiment.

Referring to FIG. 2, the bus type switch socket bracket according to a second embodiment is shown. The present embodiment is different from the first embodiment in that the metal body 2 is connected to a second metal body 5 received in the bracket body 1. The second metal body 5 may be directly bare to the surface of the bracket or covered with insulating material. In the present embodiment of the disclosure, the second metal body 5 is a linear metal body. A plurality of bare metal contact pads 3 is electrically connected together. But, the bracket of the first embodiment is a segmented power supply system.

Figure 3:
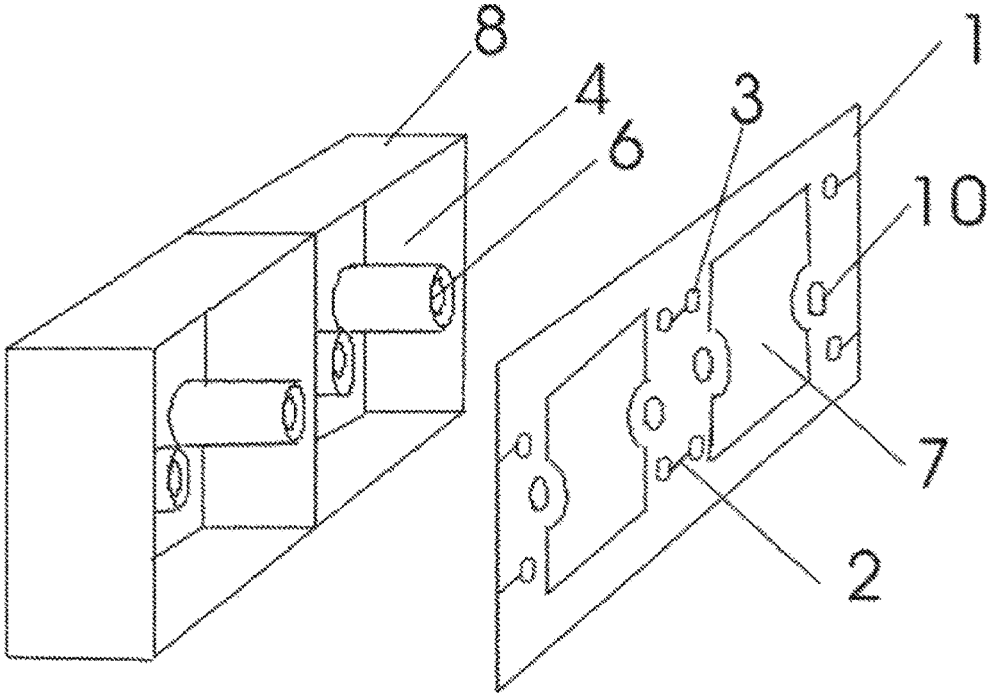
FIG. 3 is a schematic view of the bus type switch socket bracket in accordance with a third embodiment, shown together with a conventional switch receptacle bottom box.
Figure 4:
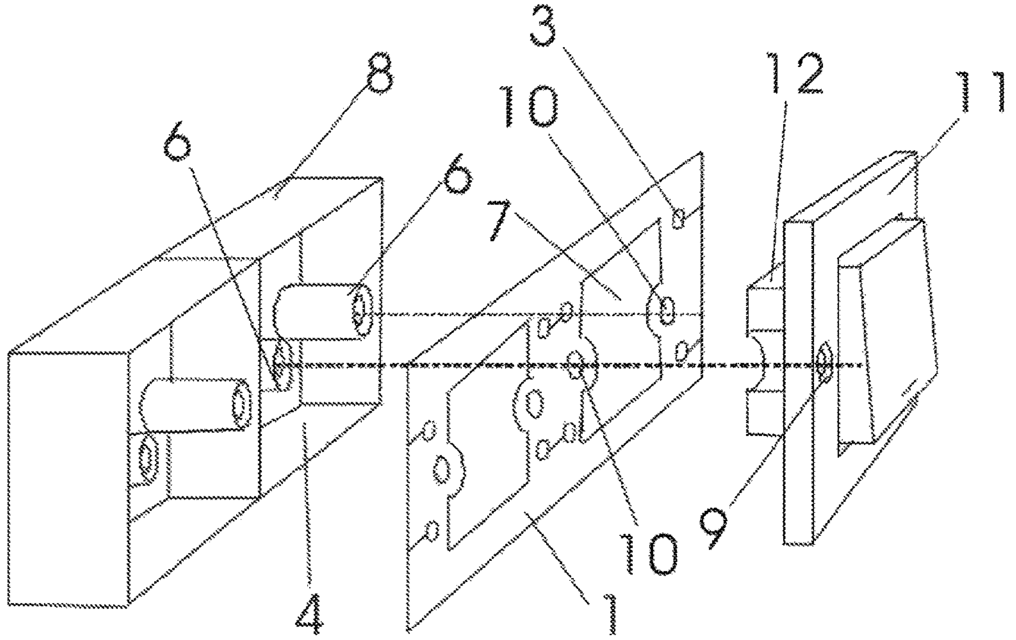
FIG. 4 is a schematic view showing the installation of the bus type switch socket bracket, the switch receptacle bottom box and the control panel in accordance with the third embodiment of FIG. 3.

Referring to FIGS. 3 and 4, the bus type switch socket bracket according to a third embodiment is shown. In the present embodiment, the bus type switch socket bracket includes a pair of control panel mounting holes 7 installed with a conventional switch receptacle base box 8 and a conventional control panel 11.

The power supply, communication or control circuit of the intelligent product is connected to the back of the switch receptacle bottom box 8 and then connected to the metal body 2 (or the second metal body 5). The bracket body 1 is positioned on the upper of the switch receptacle bottom box 8. A backseat 12 of the control panel 11 passes through the control panel mounting hole 7 and then enters a receiving room 4 of the switch receptacle bottom box 8, a screw passes through the control panel screw hole 9 and the bracket mounting hole 10 in turn, and then is screwed and fixed in the screw mounting portion 6.

In the present embodiment of the disclosure, the bus type switch socket bracket is mounted between the switch receptacle bottom box 8 and the control panel 11. The present disclosure only provides a bus type switch socket bracket, but does not include the switch receptacle bottom box 8 and the control panel 11.

For example, the control panel 11 is a control device for an intelligent product at home, a metal conductor (not shown) is provided at a position corresponding to the bare metal contact pad 3 behind the control panel 11. The metal conductor is connected to the backseat 12. Thus, when the control panel 11 is mounted on the bracket body 1, the bare metal contact pad 3 is connected to the metal conductor, and then the control panel 11 can be operated and used for intelligent control.

Since the present disclosure may have a plurality of control panel mounting holes. It is possible to integrate other switch sockets, control keyboards, surveillance cameras, background music horns, sensors and the like into the bus type switch socket bracket of the present disclosure. Thereby, it is not only beautiful and practical, but also easy to use.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A bus type switch socket bracket comprising:

a bracket body (1) comprising at least one control panel mounting hole (7), the control panel mounting hole (7) comprising an bare metal contact pad (3) arranged on sides thereof and connected with a metal body (2) embedded in the bracket body (1): wherein the bare metal contact pad (3) serves as a bus access port which is provided low-voltage direct current power supply, communication and control lines of various control panels mounted on the bracket body (1).

2. The bus type switch socket bracket as claimed in claim 1, wherein a bracket mounting hole (10) is arranged on a side of the control panel mounting hole (7).

3. The bus type switch socket bracket as claimed in claim 1, wherein the bare metal contact pad (3) is arranged on upper and low ends of two opposite sides of the control panel mounting hole (7).

4. The bus type switch socket bracket as claimed in claim 2, wherein a pair of bracket mounting holes (10) is respectively arranged in a middle of two sides of the control panel mounting hole (7).

5. The bus type switch socket bracket as claimed in claim 1, wherein the metal body (2) is a linear metal body.

* * * * *